Feb. 20, 1951 V. F. ZAHODIAKIN 2,542,968
FASTENING DEVICE
Filed Dec. 29, 1945
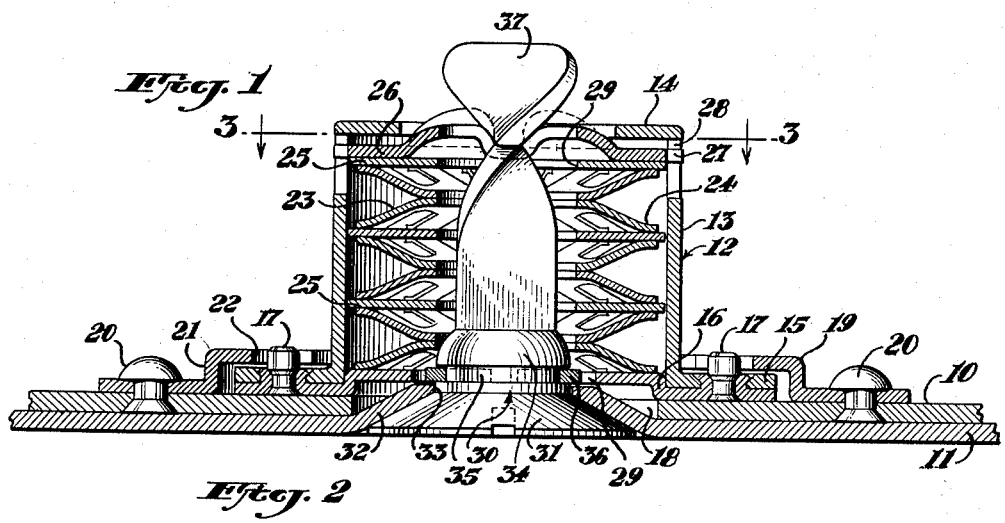
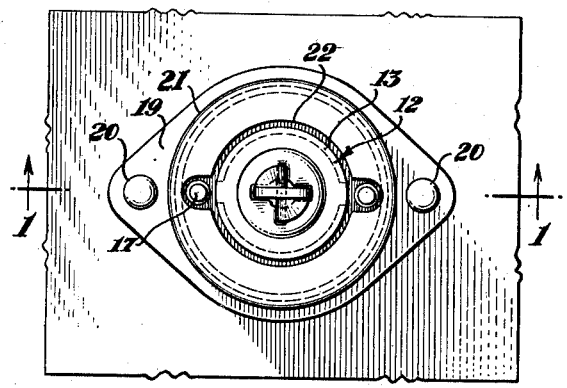
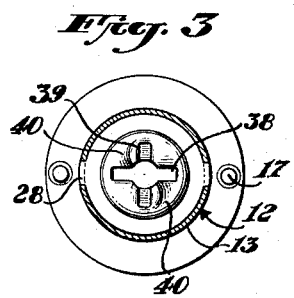
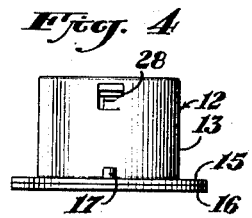
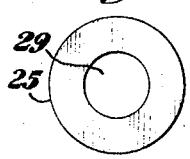 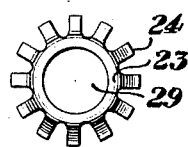
INVENTOR.
VICTOR F. ZAHODIAKIN
BY
*Ward, Arey, Herron & Evans*
ATTORNEYS Patented Feb. 20, 1951

2,542,968

UNITED STATES PATENT OFFICE 2,542,968

FASTENING DEVICE

Victor F. Zahodiakin, Short Hills, N. J.

Application December 29, 1945, Serial No. 638,303

2 Claims. (Cl. 24—221)

This invention relates to fastening devices and is particularly directed to a type of fastening device employing a stud and socket wherein the stud rotates for co-action with the socket and wherein spring pressure holds the stud and socket in fixed relationship. The present invention is in the nature of an improvement upon the prior patents of the present inventor, Nos 2,258,668, 2,262,418, 2,355,196, and the pending application, Serial Number 585,664, filed March 30, 1945, now Patent No. 2,487,916.

In the present invention, the inventor has recognized the necessity for the provision of an accurate type of spring and, further, the necessity for employment of a spring structure which will be accurate in use and will hold up under excessive pressure. Further, he has recognized the fact that there should be some provision for lateral adjustment to overcome difficulties in aligning the stud and socket as they are secured together.

As stated in the co-pending application of Victor F. Zahodiakin, Serial No. 638,304, filed December 29, 1945, entitled "Improvements in Spring Devices," up to the present time it has been impossible to construct a commercial coil spring so that its solid height, that is, its height when fully compressed, will be within the limits of one-thousandths of an inch. Further, the commercial coil springs now manufactured do not hold up well enough for certain uses since excessive pressures on them will cause their shape to change. As they are compressed, their outside diameters will vary and this will cause difficulty in the operation of the device in which they are incorporated, thereby destroying the efficiency of the device.

It has, therefore, been an object of the present inventor to provide an improved fastening device which incorporates inexpensive and accurate spring devices which can be manufactured through simple and well-known manufacturing methods, particularly by stamping. In other words, it is the purpose of this inventor to provide a spring device of general utility in which the elements are stamped and are assembled and related in such fashion as to result in a constant solid heighth within the limits of one-thousandths of an inch, and further, a compressible device which will not become deformed under excessive pressure.

The spring elements used in this invention, when fully pressed together, become a solid structure and deformation cannot occur within the elastic limits of the material. Therefore, the accuracy of the device is only limited by the normal maximum stress limits of the material used in the discs or plates making up the assembly.

It has been a further object to provide means for guiding and retaining a socket element with respect to the spring structure and for appropriately housing or containing the spring elements.

A still further object has been the provision of an improved mounting for the spring unit so that it may shift laterally if there is any axial mis-alignment at the time of insertion of the stud in the socket. That is to say, the parts will line up for an efficient fastening operation as insertion takes place and the spring structure is compressed.

Other objects and certain advantages of the invention will be more fully apparent from a description of the drawings, in which:

Figure 1 is a sectional view taken diametrically through the device.

Figure 2 is a top plan view of Figure 1.

Figure 3 is a sectional view taken on line 3—3, Figure 1.

Figure 4 is a side view of the structure illustrating the slots in the housing which guide the cam and locking plate.

Figure 5 is a plan view of one of the flat intermediate discs.

Figure 6 is a plan view of one of the conical discs of the spring structure.

In the embodiment of the invention illustrated in the drawings, the plates to be secured together are indicated at 10 and 11. Throughout the description, these plates will be referred to as upper plate 10 and lower plate 11 with the remainder of the parts so related.

The housing structure for the spring is generally indicated at 12 and includes a cylindrical side wall 13, an inwardly extended upper flange 14 and an outwardly extended base flange 15. The base flange 15 has a bottom plate 16 secured thereto against its underside by means of rivets 17. The central portion of the bottom plate is pressed upwardly so as to fit within the circular contour of the housing.

The housing structure 12 rests upon the upper plate 10 about a bore 18 in the plate and is maintained in position by means of a retainer element 19. This retainer element is fixed in relation to the plate 10 by means of rivets 20 and includes a circular raised portion 21 overhanging the base flange 15 of the housing. The retainer member 19 includes an opening 22 clearing the housing and the rivets 17 whereby the housing structure may slide laterally on the plate 10 in the event that the stud and socket structure is not aligned.

Within the housing, a plurality of sets of conical discs 23 is provided. Each of these discs includes outwardly or radially projected prongs 24. The diameter of these discs, when relaxed, is less than the inside diameter of the housing so that when the plates are compressed the prongs will not bind in the housing. The elements of each set of discs are oppositely related, that is to say, the prongs project toward each other. Between these adjacent discs, flat washers or plates 25 are provided.

At the lower end of the structure a lowermost discs 23 is provided which has its prongs extending downwardly and contacting the bottom plate 16. At the upper end of the assembly and on top of the upper flat disc 25, a cam and locking plate 26 is mounted. This cam and locking plate includes radial extensions 27 which traverse vertical slots formed in the diametrically opposite portions of the side wall of the cylindrical member 12. Thus, the plate may move axially in the housing but cannot rotate. All of the conical discs and the bottom plate include central axially aligned openings 29.

The locking stud 30 is mounted for rotation in the lower plate 11. It includes a conical head 31 having a flat underside disposed flush with the underside of the plate 11. This conical head fits in a conical depression 32 of the plate 11. The shank of the stud passes through an opening 33 in the plate. The enlarged portion 34 of the stud, adjacent the bottom plate of the housing, includes an annular groove 35 within which a locking washer 36 is mounted. This washer is of greater diameter than the opening 33 and lies just above the margin of the opening thus preventing axial displacement of the stud from the plate.

The upper end of the stud incorporates a helical portion 37 adjacent the cam and locking plate 26. This cam and locking plate (Figures 2 and 3) includes a diametric slot 38 and a diametric groove 39 in its top surface at right angles to the slot. The circumferential approaches to the groove are inclined as at 40 whereby the helical portion will snap into position in the groove when rotated 90°. When it snaps into position, the spring plates, or conical discs, are under compression and the cam and locking plate and the stud are efficiently fixed against accidental displacement. The plates 10 and 11 are held together under spring pressure and this same spring pressure tends to prevent the aforesaid accidental displacement.

Having described the invention, the following claims are made:

1. In a stud and socket device for fastening a pair of inner and outer superimposed plates together in which the stud is rotatably mounted in the outer plate and the socket mounted upon the inner face of the inner plate, said stud having a helical blade portion adapted to engage within the socket, a socket structure comprising: a housing having a cylindrical side wall, an outwardly extended base flange, an inwardly extended flange at the end of the housing opposite the base flange, and a base plate secured to the base flange; said base plate having an opening therein to accommodate the stud; a cam plate within the housing at the inner end thereof adjacent the inwardly extended flange; means keying the cam plate to the housing, said means permitting axial but not rotative movement of the cam plate relative to the housing; a plurality of sets of superimposed conical discs stacked within the housing between the base plate and the cam plate; each of said sets including oppositely related discs, with each of said discs including resilient radial prongs; a flat washer disposed between each of the sets of discs and engaged by the prongs of adjacent discs; said discs and washers configurated centrally to provide an axial opening through the disc and washer stack to permit passage of the stud therethrough; said cam plate configurated centrally to provide a diametric slot engageable by the helical blade portion of the stud, whereby the cam plate is drawn inwardly on the stacked sets of discs, compressing them, upon rotation of the stud; and said cam plate configurated to provide a groove engageable by the helical blade portion of the stud for locking the stud at a point of rotation in which the stacked sets of discs are under compression.

2. In a stud and socket device for fastening a pair of inner and outer superimposed plates together in which the stud is rotatably mounted in the outer plate and the socket mounted upon the inner face of the inner plate, said inner plate having an opening therein to permit insertion of the stud into the socket, and said stud having a helical blade portion adapted to engage within the socket, a socket structure comprising: a cylindrical housing having an outwardly extended base flange, an inwardly extending flange at the end opposite the base flange, and a base plate secured to the base flange; said base plate having an opening therein to accommodate the stud; a retainer element secured to the inner face of the inner plate and having a circular raised portion overhanging the base flange of the housing, said retainer element having a central opening therein of greater diameter than the cylindrical housing whereby the housing may be shifted laterally on the inner plate in order to align the housing with the stud; a cam plate within the housing at the inner end thereof adjacent the inwardly extended flange; means keying the cam plate to the housing, said means permitting axial but not rotative movement of the cam plate relative to the housing; a plurality of sets of superimposed conical discs stacked within the housing between the base plate and the cam plate; each of said sets including oppositely related discs with each of said discs including resilient radial prongs; a flat washer disposed between each of the sets of discs and engaged by the prongs of adjacent discs; said discs and washers configurated centrally to provide an axial opening through the disc and washer stack to permit passage of the stud therethrough; said cam plate configurated centrally to provide a diametric slot engageable by the helical blade portion of the stud, whereby the cam plate is drawn inwardly on the stacked sets of discs, compressing them, upon rotation of the stud; and said cam plate including means engageable by the helical blade portion of the stud for locking the stud at a point of rotation in which the stacked sets of discs are under compression.

VICTOR F. ZAHODIAKIN.

REFERENCES CITED

The following references are of record in the file of this patent:

UNITED STATES PATENTS

| Number | Name | Date |
|---|---|---|
| 44,925 | Alden | Nov. 8, 1864 |
| 98,672 | Daniel | Jan. 11, 1870 |
| 377,125 | Trent | Jan. 31, 1888 |
| 2,307,132 | Hufferd | Jan. 5, 1943 |
| 2,399,750 | Marty | May 7, 1946 |
| 2,406,007 | Eisele | Aug. 20, 1946 |
| 2,420,042 | Johnson | May 6, 1947 |

FOREIGN PATENTS

| Number | Country | Date |
|---|---|---|
| 405,549 | France | Feb. 5, 1912 |